(12) United States Patent
Jang

(10) Patent No.: US 6,463,684 B2
(45) Date of Patent: Oct. 15, 2002

(54) TEMPERATURE-COMPENSATED LONG-PERIOD OPTICAL FIBER GRATING FILTER USING MULTI-CLADDING STRUCTURE

(75) Inventor: Ju-Nyung Jang, Seoul (KR)

(73) Assignee: Samsung Electronics Co., Ltd., Suwon (KR)

(*) Notice: Subject to any disclaimer, the term of this patent is extended or adjusted under 35 U.S.C. 154(b) by 104 days.

(21) Appl. No.: 09/754,914

(22) Filed: Jan. 5, 2001

(65) Prior Publication Data

US 2002/0122624 A1 Sep. 5, 2002

(30) Foreign Application Priority Data

Jan. 10, 2000 (KR) .................................. 00-906

(51) Int. Cl.[7] ................................. G02B 6/34
(52) U.S. Cl. .................... 38/37; 385/128; 385/124; 385/141; 359/130
(58) Field of Search .................... 385/37, 24, 31, 385/128, 141, 123–127; 359/130, 178

(56) References Cited

U.S. PATENT DOCUMENTS 6,314,222 B1 * 11/2001 Jang et al. .................... 385/37

* cited by examiner

Primary Examiner—Phan T. H. Palmer
(74) Attorney, Agent, or Firm—Steve Cha; Klauber & Jackson

(57) ABSTRACT

A temperature-compensated, long-period grating using a multi-cladding structure having an optical fiber including a core with a plurality of long-period gratings formed periodically thereon, and the core is doped with a first dopant to exhibit a positive coupling wavelength shift as the temperature increases; an inner cladding surrounding the core with a refractive index lower than the core; and, an outer cladding surrounding the inner cladding with a lower refractive index than said inner cladding, and the outer cladding is doped with a second dopant to exhibit a negative coupling wavelength shift as the refractive index of the outer cladding is increased with temperature so that the positive wavelength shift and the negative wavelength shift are canceled out.

16 Claims, 7 Drawing Sheets

TEMPERATURE-COMPENSATED LONG-PERIOD OPTICAL FIBER GRATING FILTER USING MULTI-CLADDING STRUCTURE

BACKGROUND OF THE INVENTION

1. Field of the Invention

The present invention relates generally to optical fiber gratings, and more particularly to a temperature-compensated long-period grating.

2. Description of the Related Art

An optical fiber grating is typically used as a filter for selecting an optical signal at a particular wavelength traveling along the core of an optical fiber. By combining fiber gratings in various arrangements, the optical fiber grating directs or reflects light at a particular wavelength to different output fibers. Basically, there are two types of gratings with varying reflective index periods inside the fiber: a short period grating and a long-period grating.

The short period gratings reflect light at a particular wavelength, whereas the long-period gratings couple light from a core mode to a cladding mode. Typically, long-period gratings with the period of tens of micrometers to hundreds of micrometers are used as a gain flattened filter for an erbium doped fiber amplifier (EDFA) as they can remove light at a particular wavelength by coupling light from the core mode to the coupling mode. These long-period gratings are fabricated by inducing a periodic change in the refractive index of the photosensitive area of the core. The refractive index of the fiber changes when exposed to the UV (Ultra Violet) light. Hence, a periodic change in the refractive index can be produced using the light exposure. Moreover, the long-period gratings are very sensitive to the temperature change as well as the ambient refractive index of the cladding. Furthermore, micro bending of the optical fiber has great influences over the peak wavelength and the extinction ratio of the long-period gratings.

Coupling between the core and cladding occurs when the long-period grating filter satisfies a phase matching condition given as:

$$\beta_{CO} - \beta_{cl}^{(m)} = \frac{2\pi}{\Lambda}, \quad (1)$$

wherein $\beta_{co}$ represents a propagation constant in the core mode, $\beta_{cl}^{(m)}$ represents a propagation constant in the cladding mode, and $\Lambda$ represents a grating period.

For $$\beta = 2\pi \frac{n}{\lambda}$$

(where n represents a refractive index and $\lambda$ represents a wavelength), Eq. (1) can be expressed as:

$$n_{CO} - n_{cl}^{(m)} = \frac{\lambda}{\Lambda}. \quad (2)$$

Accordingly, light at a particular wavelength is coupled to the cladding mode, and it is represented by the difference between a grating period $\Lambda$ and a refractive index difference $(n_{co}-n_{cl}^{(m)})$.

The refractive index difference is readily achieved by appropriately irradiating an optical fiber to the UV light using a UV laser. The optical fiber exposed to the UV light is covered with a mask with a predetermined grating period $\Lambda$, then the UV laser is projected onto the fiber via the mask in order to increase the refractive index of the core of the optical fiber. As the refractive index increases, the coupling wavelength becomes longer. For a desired spectrum, that is, a desired coupling wavelength and desired extinction ratio of a long-period grating device, the UV laser must be projected for an appropriate period of time while controlling the mask period precisely.

The coupling wavelength of the above long-period fiber gratings is affected by temperature changes. The shift of the coupling wavelength caused by temperature change is determined by temperature-induced changes in the refractive index and the thermal expansion along the length of the fiber. This relationship is represented, as below:

$$d\lambda^{(m)}/dT = (d\Lambda/dT)(\delta n)^{(m)} + \Lambda d(\delta n)^{(m)}/dT \quad (3)$$
$$= (d\lambda^{(m)}/d(\delta n)^{(m)})(d(\delta n)^{(m)}/dT) +$$
$$(d\lambda^{(m)}/d\Lambda)(d\Lambda/dT),$$

wherein T represents temperature.

For a general silica optical fiber, $d\lambda^{(m)}/dT$ is a 5–15 nm per 100° C. change in temperature. Here, temperature dependency can be decreased by setting $d\lambda^{(m)}/d\Lambda$ to a negative value or setting $d(\delta n)^{(m)}/dT$ to zero. In fabricating a long-period grating using a general optical fiber or distributed shifted fiber for communication, the second term of Eq. (3) on the right side is neglected as it is significantly less than the first term. For example, the coupling wavelength shifts by a 5 nm per 100° C. change in temperature when a fiber (i.e., Flexcor 1060 made by the Corning Co.) is used. When a distributed shifted-fiber is used, the lengthwise expansion shifts the coupling wavelength by only 0.3 nm per 100° C., whereas the refractive index shifts the coupling wavelength by 5 nm per 100° C. However, the temperature stability of about 0.3 nm per 100° C. is required for a gain flattened filter to be effective.

For temperature compensation, the refractive index profile of an optical fiber can be arranged differently, or the grating period can be selected such that the $d\lambda^{(m)}/d\Lambda$ in Eq. (3) becomes a negative value. Alternatively, $B_2O_3$ can be added to make the dn/dT of Eq. (3) zero.

It is known that $d\lambda^{(m)}/d\Lambda$ becomes a negative value, by controlling the refractive index in a typical long-period fiber filter, when $\Lambda < 100$ $\mu$m. In the case of using fibers, i.e., Flexcor 1060 made by the Corning Co., temperature-dependent wavelength change is about a 0.15–0.45 nm per 100° C. change in temperature for $\Lambda=40$ $\mu$m, but the $\lambda^{(m)}$ mode is in the 1.1 $\mu$m region which falls outside the communication region.

$d(\delta n)^{(m)}/dT$ can be set to zero when $$d\lambda^{(m)}/dT=(d\Lambda/dT)(\delta n)^{(m)}+\Lambda d(\delta n)^{(m)}/dT \quad (4),$$

wherein $d\Lambda/dT$ corresponds to the thermal expansion. When silica is used, $a_{SiO2}=5.5\times10^7/°$ C. and the contribution of $d\Lambda/dT$ to wavelength dependency becomes negligible, i.e., 0.1 nm or below per 100° C. Then, the effect of $d(\delta n)^{(m)}/dT$ can be expressed as:

$$d(\delta rt)^{(m)}/dT=d(n_{01}-n^{(m)})/dT=d(n_{core}-n^{SiO2})/dT \quad (5).$$

Here, $d(\delta n)^{(m)}/dT$ can be zero by doping the core with appropriate amounts of $GeO_2$ ($dn_{Ge}/dT>dn_{SiO2}$) and $B_2O_3$ ($dn_B/dT < dn_{SiO2}/dT$). For reference, the temperature compensation effect is disclosed in detail "Optical Waveguide Grating and Production Method Thereof", EP 0 800 098 A2.

The applicant in this invention has filed two applications relating to a temperature-controlled long-period grating device. Both disclose controlling materials that may be considered in selecting recoating material to be applied around the cladding for achieving temperature-compensated fiber gratings. One method is disclosed in the Korea Application No. 1999-8332 filed with the Korean Patent Office. In this application, dn/dT of the core is provided to be greater than dn/dT of the cladding due to higher Ge concentration in the core, wherein the coupling peak of long-period gratings shifts to a long wavelength as temperature increases. Here, the requirement of a recoating material is that its refractive index increases with temperature to induce a short wavelength shift effect through the refractive index of a coating material. Another method is disclosed in Korea Application No. 1999-38267, which is filed by the present applicant. In this application, dn/dT of the core is less than dn/dT of the cladding by adding Ge/B. As temperature increases, the short wavelength effect takes place in the mode of the long-period gratings. The requirement of a coating material around the cladding includes that its refractive index increases with temperature to compensate the short wavelength shift effects, by using the long wavelength shift effect of the recoating material. In both methods, the initial refractive index of the coating material around the cladding must be less than the refractive index of the cladding in order to guide both the core mode and the cladding mode.

A typical recoating material, for example, a polymer, experiences thermal expansion as the temperature increases. Therefore, when the polymer is recoated on long-period gratings using a general optical fiber, the long wavelength shift effect of the long-period gratings amounts to the long wavelength shift effect of the recoating. Hence, it is necessary to use a special recoating material so that the refractive index decreases with temperature. A temperature-compensated long-period grating filter is disclosed in the Korea Application No. 99-38267, and it discloses a grating that is highly sensitive to the external environment.

Some of the known methods, as described in the preceding paragraphs, have some drawbacks. Thus, there remains a need for an additional method for stablizing long-period gratings.

SUMMARY OF THE INVENTION

It is, therefore, an object of the present invention to provide a temperature-compensated long-period grating using a multi-cladding structure.

It is another object of the present invention to provide a temperature-compensated long-period grating using a multi-cladding structure that is not sensitive to the external environment.

It is a further object of the present invention to provide a long-period grating in which the cladding mode is determined by the inner cladding which results in a great overlapping integration between the core mode and the cladding mode, thereby increasing the coupling efficiency, and this increased coupling efficiency facilitates the growth of a coupling mode in fabricating long-period gratings.

To achieve the above objects, there is provided a temperature-compensated long-period grating filter using a multi-cladding structure which includes a plurality of long-period gratings formed periodically along the core, which is doped with a first dopant to exhibit a positive coupling wavelength shift as temperature increases, wherein the inner cladding is formed around the core and has a refractive index lower than that of the core, and wherein the outer cladding is formed around the inner cladding and has a lower refractive index than that of the inner cladding, and is also doped with a second dopant to exhibit a negative coupling wavelength shift as the refractive index of the outer cladding is increased with temperature.

According one aspect of the present invention, the positive wavelength shift and the negative wavelength shift are canceled out in a temperature-controlled grating package.

According to another aspect of the present invention, an optical fiber used for the temperature-compensated long-period grating filter includes a plurality of long-period fiber gratings formed periodically along the core that is doped with a first dopant to exhibit a negative coupling wavelength shift as the temperature increases; an inner cladding formed around the core with a refractive index lower than that of the core; an outer cladding formed around the inner cladding with a lower refractive index than that of the inner cladding, and doped with a second dopant to exhibit a positive coupling wavelength shift as the refractive index of the outer cladding is increased with temperature, wherein the positive wavelength shift and the negative wavelength shift are canceled out.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described hereinbelow with reference to the accompanying drawings. For the purpose of clarity, well-known functions or constructions are not described in detail as they would obscure the invention in unnecessary detail.

In order to form long-period gratings along the optical fiber, a predetermined length of the coating on the fiber is initially removed; then, the long-period gratings are formed along the coating removed area when the light is illuminated from the UV laser via an amplitude mask.

Figure 1:
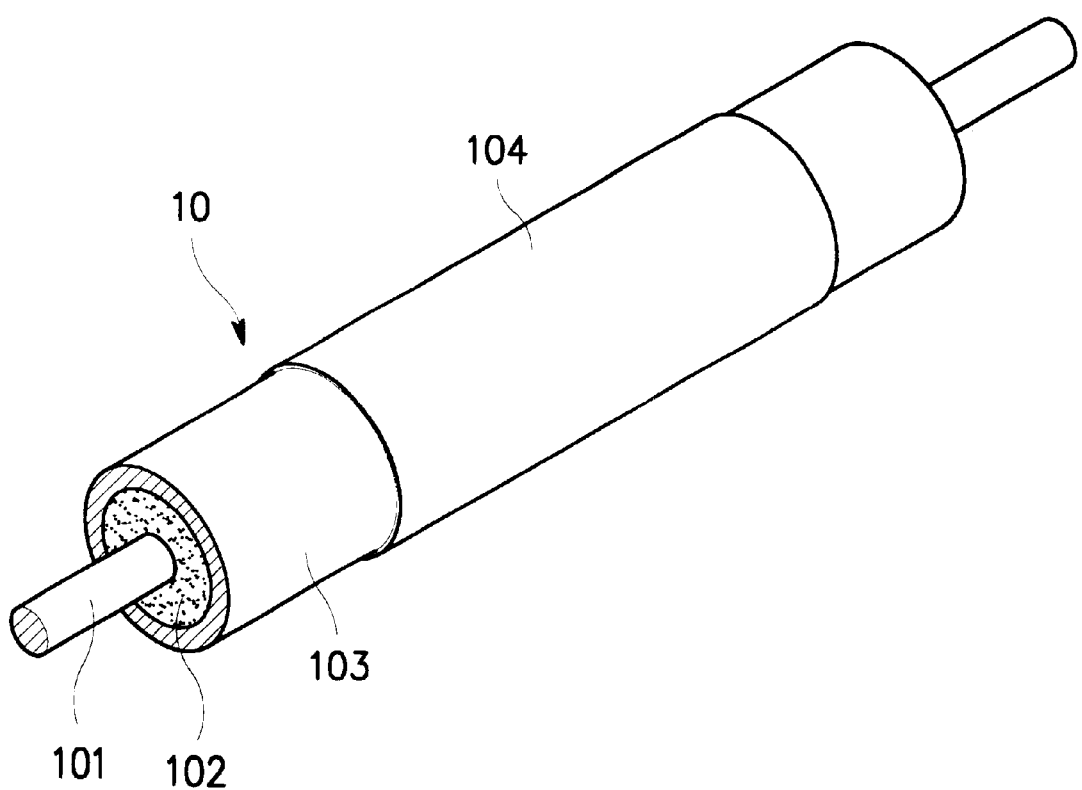
FIG. 1 is a perspective view of a packaged long-period grating filter.
Figure 2:
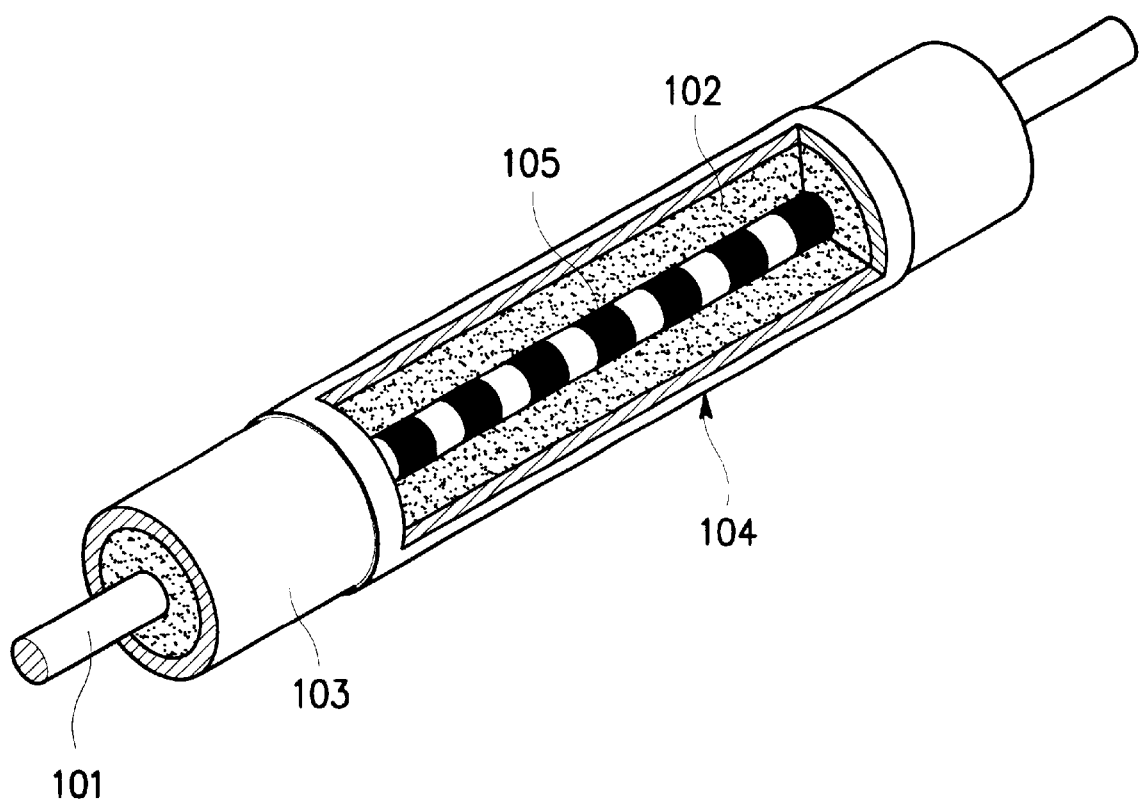
FIG. 2 is a sectional perspective view of long-period fiber gratings inside the packaged long-period grating filter.
Figure 3:
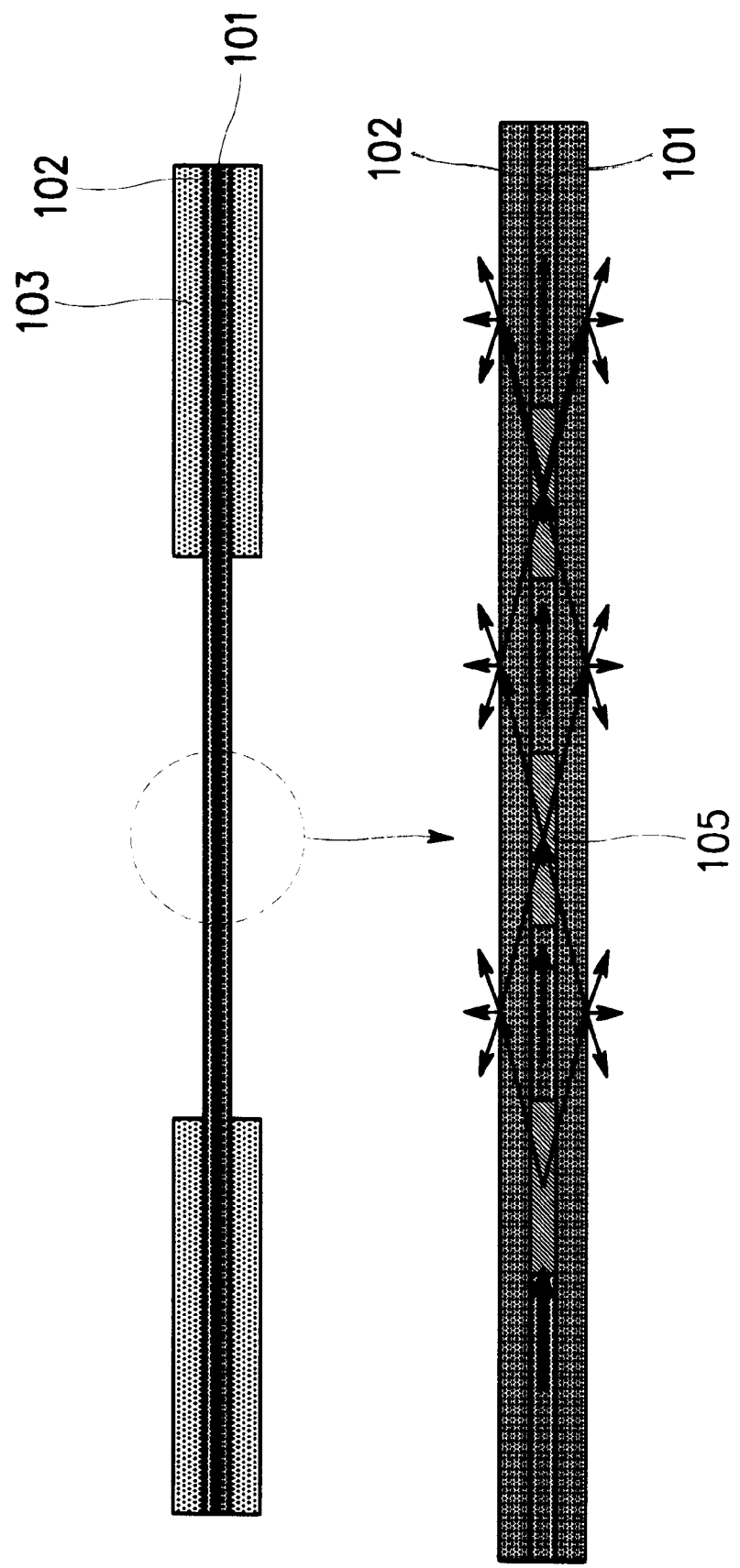
FIG. 3 is a sectional view of the long-period grating filter illustrating the coupling mechanism thereof.

FIG. 1 shows the perspective view of a packaged optical fiber grating filter. FIG. 2 shows a sectional perspective view of long-period gratings in the packaged optical fiber grating filter. FIG. 3 illustrates the coupling mechanism in the long-period optical fiber grating filter.

Referring to FIGS. 1 and 2, the long-period grating package according to the present invention includes a core 101 in which long-period fiber gratings 105 are formed at a predetermined interval; a cladding 102 surrounding the core 101; a coating 103 surrounding the cladding 102; and, a recoating 104 covering the coating 103 over the long-period fiber gratings 105.

Referring to FIG. 3, light is scattered at the refractive index changing region, that is, at the long-period fiber gratings 105 in the fundamentally guided mode of the core 101. As the scattered light is coupled to the cladding 102, the light at a wavelength satisfying the phase matching condition is coherently reinforced. Here, part of the light at the wavelength is directed out of the cladding 102. Hence, the long-period optical fiber grating filter acts as a wavelength dependent attenuator. Accordingly, the light intensity traveling in the fundamental guided mode decreases as it passes through the long-period fiber gratings 105 (as indicated by arrows that get thinner along the length of the core 101), whereas light intensity at the wavelength coupled to the cladding 102 increases (as indicated by arrows that get thicker toward the cladding 102). The light intensity at the coupling wavelength increases along the length direction of the optical fiber after passing through the fiber gratings 105. Thus, the long-period optical grating filter acts as an optical attenuator.

The refractive index of air, an external factor of the cladding 102 is 1. If the cladding 102 is recoated with a material with the refractive index n after the long-period fiber gratings 105 are formed, the coupling condition is changed and the coupling wavelength shifts to either a long wavelength or a short wavelength according to the characteristics of the recoating material.

Figure 4:
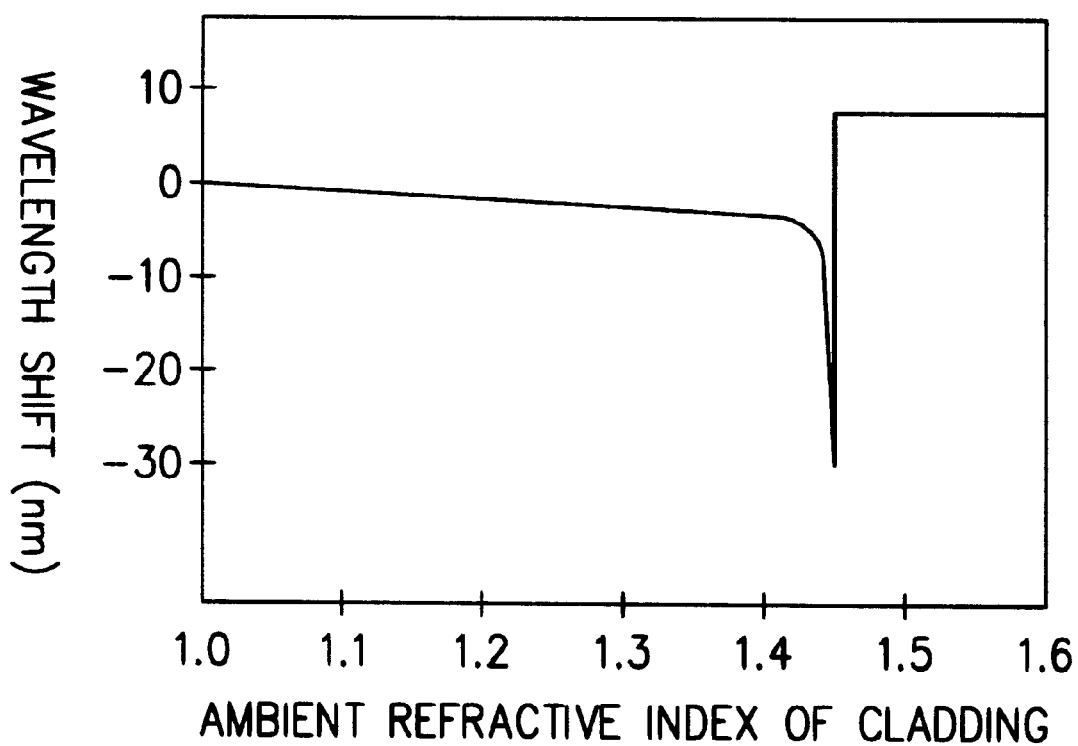
FIG. 4 is a graph showing the wavelength shifts versus the ambient refractive indexes of the cladding.

FIG. 4 is a graph showing the shift of the coupling wavelength with respect to the variation in the ambient refractive index of the cladding. Referring to FIG. 4, the coupling peak shifts as the ambient refractive index changes. With the refractive index of air (n=1) as the basis of the ambient refractive index of the cladding, the coupling wavelength shifts to a short wavelength as the ambient refractive index increases from 1.0. However, the coupling peak disappears when the ambient refractive index equals the refractive index of the cladding. If the ambient refractive index exceeds the refractive index of the cladding, the coupling wavelength shifts to a long wavelength. That is, the coupling wavelength shifts to a short wavelength in the region where the external refractive index starting from the refractive index of the air is less than the refractive index of the cladding, but shifts to a long wavelength in the region where the ambient refractive index is greater than the refractive index of the cladding. Here, the short wavelength shift refers to a negative wavelength shift, and the long wavelength shift refers to a positive wavelength shift.

For a detailed description of the wavelength shift effect with respect to the change of external refractive index of the cladding, see "Displacement of the Resonant Peaks of a Long-Period Fiber Grating Induced by a Change of Ambient Refractive Index", 1997 Optics letters: Dec. 1, 1997/Vol. 22, No. 23.

As described above, the present invention is intended to design an optical fiber profile, which can compensate the temperature sensitivity of the fiber utilizing the above-described property of the long-period fiber gratings. The present invention is also intended to design an optical fiber that can compensate temperature using a multi-cladding structure (described later).

Figure 5:
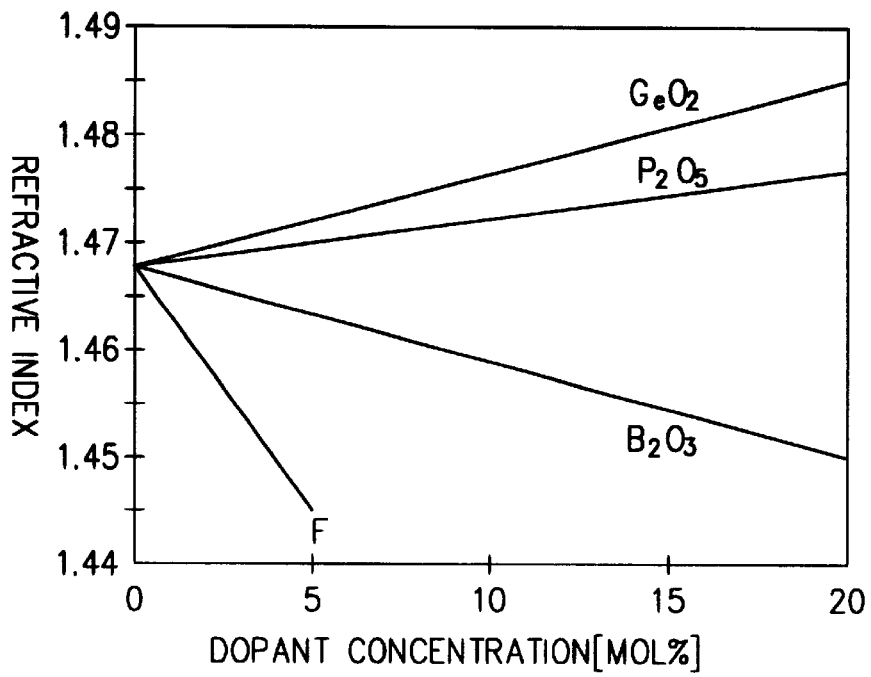
FIG. 5 is a graph showing the relationship between the refractive indexes and the dopant concentrations.
Figure 6:
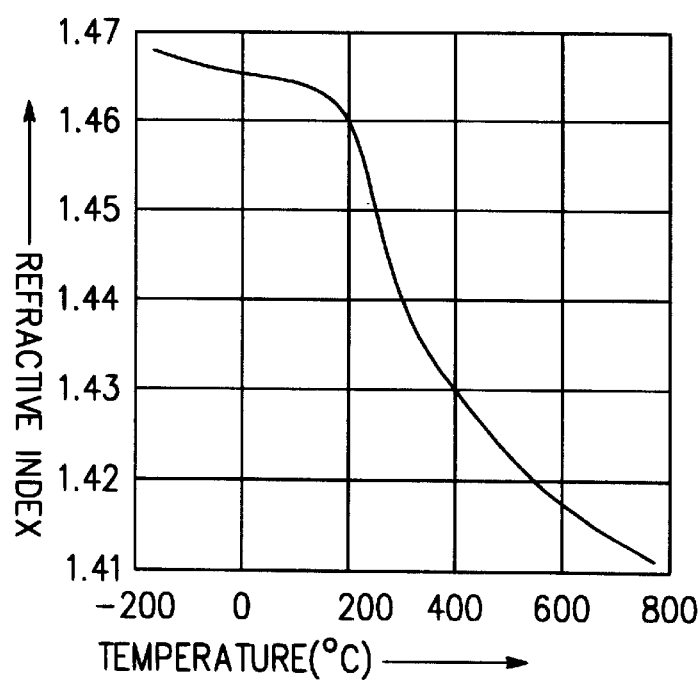
FIG. 6 is a graph showing the relationship between the refractive indexes and the temperature of pure $B_2O_3$.

FIG. 5 is a graph showing the refractive index variation with respect to a dopant concentration, and FIG. 6 is a graph showing the refractive index variation with respect to the temperature of pure $B_{2O3}$. A method of compensating temperature by doping a core with $B_2O_3$ and $GeO_2$ is disclosed in detail in "Optical Waveguide Grating and Production Method Thereof", EP 0 800 098 A2.

According to the present invention, $GeO_2$ may be used as a dopant, or both $B_2O_3$ and $GeO_2$ may be used as dopants for the core layer. The sum of a coupling wavelength shift caused by an increase in the refractive index with the amount of $GeO_2$ and a coupling wavelength shift caused by a decrease in the refractive index with the amount of $B_2O_3$ is a positive value in the core.

Similarly, only $GeO_2$ may be used as a dopant, or both $B_2O_3$ and $GeO_2$ as dopants for an outer cladding layer according to the present invention. The sum of a coupling wavelength shift caused by an increase in the refractive index with the amount of $GeO_2$ and a coupling wavelength shift caused by a decrease in the refractive index with the amount of $B_2O_3$ is a negative value in the outer cladding.

In the embodiment of the present invention, if the amount of $B_2O_3$ is less in concentration than the $GeO_2$ of the core, the long-period fiber grating filter has a positive wavelength shift; thus, the coupling wavelength shifts to a long wavelength because the core-cladding refractive index difference increases as temperature increases.

Figure 7:
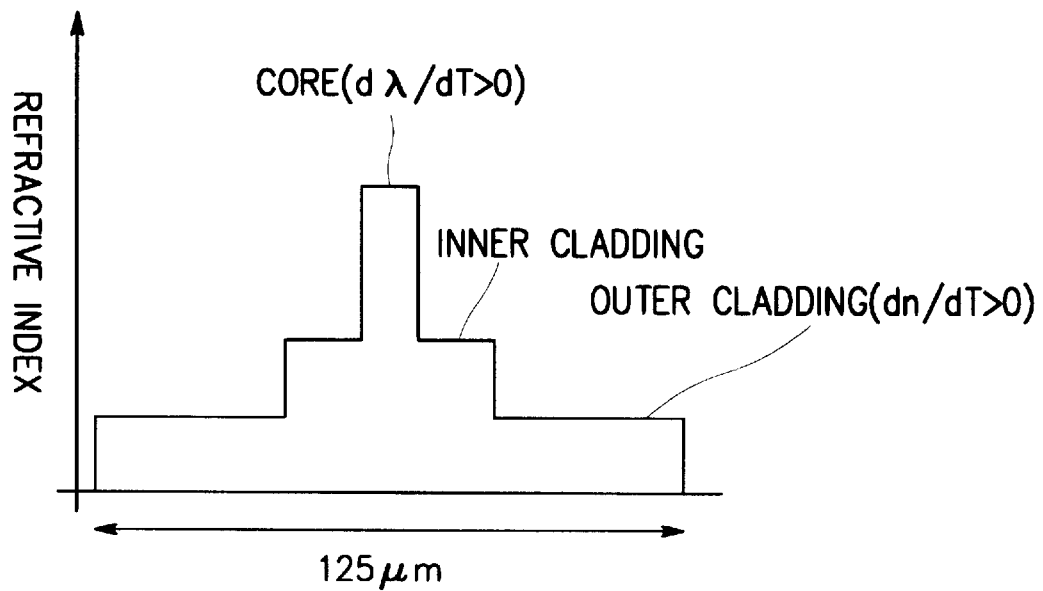
FIG. 7 illustrates the fiber profile of a temperature-compensated, long-period grating filter using a double cladding structure according to a preferred embodiment of the present invention.

FIG. 7 illustrates the optical fiber refractive index profile of a temperature-compensated long-period grating filter according to a preferred embodiment of the present invention. Referring to FIG. 7, an optical fiber includes a core, an inner cladding (primary cladding) surrounding the core, and an outer cladding (secondary cladding) surrounding the inner cladding. The diameter of the optical fiber is 125 $\mu$m.

To guide the core mode and the cladding mode simultaneously in the long-period gratings, the refractive index of the outer cladding should be less than that of the inner cladding, and the refractive index of the inner cladding should be less than that of the core. In the temperature-compensated, long-period grating filter, a positive wavelength shift occurs between the core and the primary cladding, but a negative wavelength shift occurs as the ambient refractive index of the secondary cladding is changed by doping the core with a dopant, thereby canceling out the positive wavelength shift and the negative wavelength shift.

The positive wavelength shift means $d\lambda/dT>0$ and the negative wavelength shift means $d\lambda/dT>0$, that is, $dn_{secondary\ cladding}>dT$.

The temperature-compensated, long-period grating filter using a multi-cladding structure will be described in detail hereinafter. If dn/dT of the core is greater than that of the outer cladding by doping the core with an appropriate amount of Ge or Ge+B; that is, if the coupling wavelength shifts by a positive value as the temperature increases, the refractive index of the outer cladding should be less than that of the inner cladding and should increase with temperature.

To obtain an inner cladding with a refractive index less than that of the core, the inner cladding is formed of pure silica or silica doped with small amounts of Ge and B. As shown in FIG. 6, if the concentration of B as a dopant increases, the refractive index decreases. Silica is doped with B to provide an optical fiber with an outer cladding having a refractive index lower than that of an inner cladding as the temperature increases.

Figure 8:
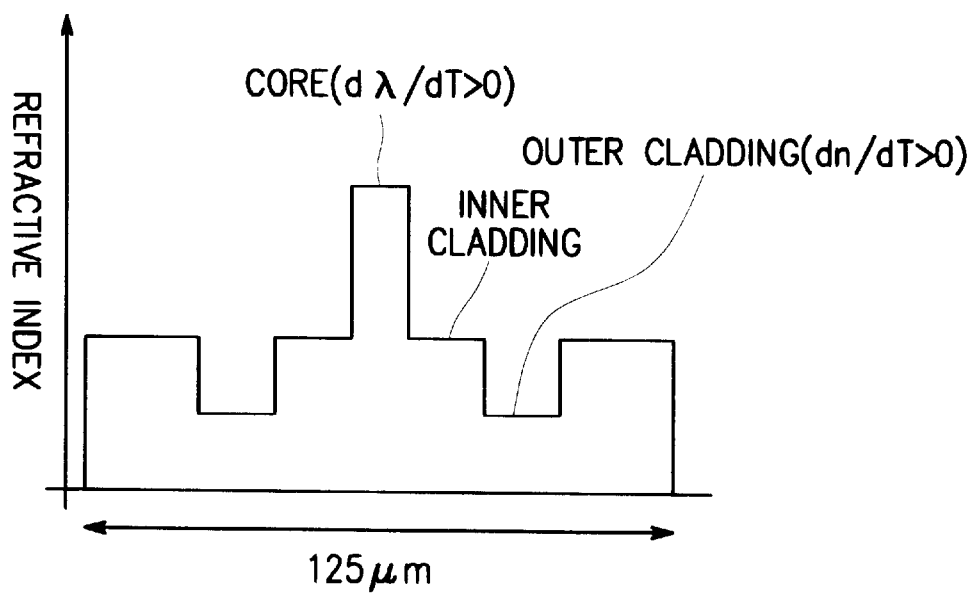
FIG. 8 illustrates the fiber profile of a temperature-compensated, long-period grating filter using a multi-cladding structure according to another preferred embodiment of the present invention.

FIG. 8 illustrates an optical fiber refractive index profile of a temperature-compensated, long-period grating filter using a multi-cladding structure according to another preferred embodiment of the present invention. An optical fiber shown in FIG. 8 has an inner cladding and outer claddings. Once the boundary condition between the inner cladding and the outer claddings is satisfied, a basic optical fiber structure for temperature compensation is completed. Specifically, the optical fiber has a core, a primary cladding surrounding the core, a secondary cladding surrounding the primary cladding, and a third cladding surrounding the secondary cladding.

Figure 9:
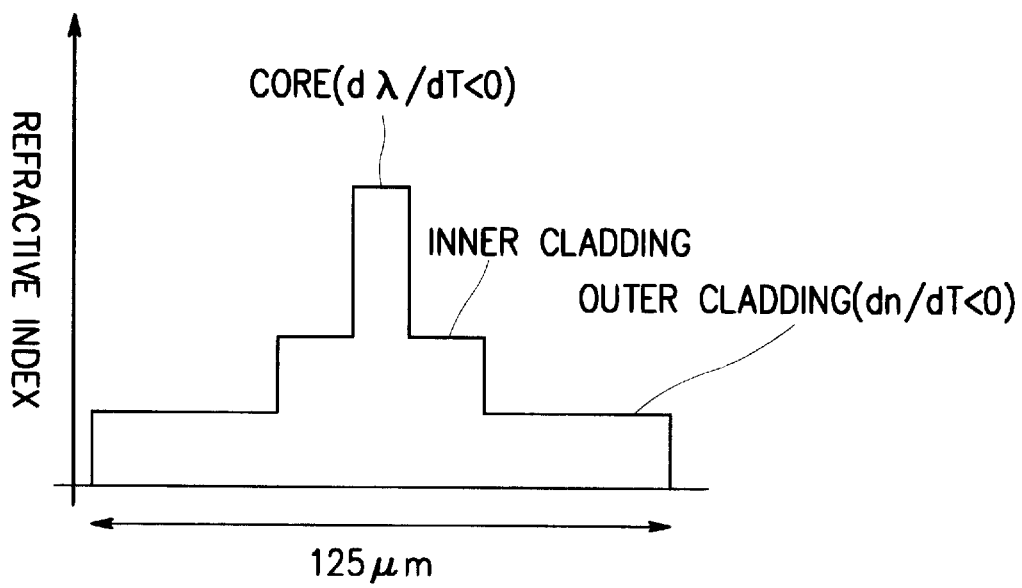
FIG. 9 illustrates the fiber profile of a temperature-compensated, long-period grating filter using a double cladding structure according to a third preferred embodiment of the present invention; and, FIG. 10 illustrates the fiber profile of a temperature-compensated, long-period grating filter using a multi-cladding structure according to a fourth preferred embodiment of the present invention.

FIG. 9 illustrates the optical fiber refractive index profile of a temperature-compensated, long-period optical fiber filter device according to a third preferred embodiment of the present invention. Referring to FIG. 9, an optical fiber includes a core, an inner cladding surrounding the core, and an outer cladding surrounding the inner cladding. The diameter of the optical fiber is 125 μm.

To guide the core mode and the cladding mode simultaneously in long-period fiber gratings, the refractive index of the outer cladding should be less than that of the inner cladding and the refractive index of the inner cladding should be less than that of the core. In the temperature-compensated, long-period grating filter according to the third embodiment of the present invention, a negative wavelength shift occurs between the core and the primary cladding by doping the core with a dopant, and a positive wavelength shift occurs as the ambient refractive index of a doped secondary cladding changes by doping the secondary cladding with a dopant, thereby canceling out the positive wavelength shift and the negative wavelength shift.

Here, the negative wavelength shift means $d\lambda/dT<0$ and the positive wavelength shift means $d\lambda/dT>0$, that is, $dn_{secondary\ cladding}/dT<0$.

The temperature-compensated, long-period grating filter using a multi-cladding structure will be described in detail hereinafter. If dn/dT of the core is less than that of the outer cladding by doping the core with an appropriate amount of Ge or Ge+B; that is, if the coupling wavelength shifts by a negative value as the temperature increases, the refractive index of the outer cladding should be less than that of the inner cladding and should decrease with temperature.

To obtain an inner cladding with a refractive index less than that of the core, the inner cladding is formed of pure silica or silica doped with a small amount of B or Ge+B. As shown in FIG. 6, if the concentration of B as a dopant increases, a refractive index decreases. Silica is doped with B to design an optical fiber with an outer cladding having a lower refractive index which is lower than that of an inner cladding and decreased as temperature increases.

Figure 10:
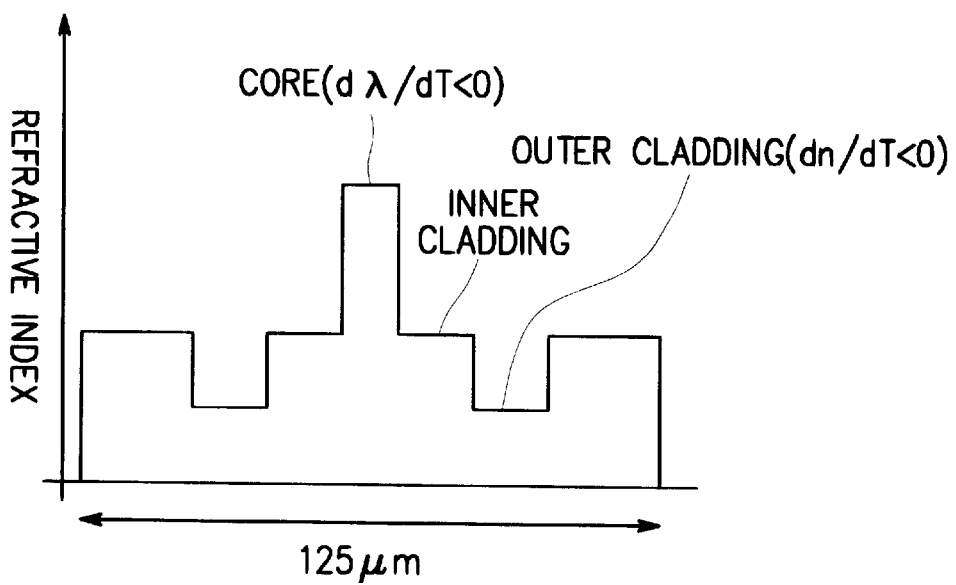

FIG. 10 illustrates the optical fiber refractive index profile of a temperature-compensated, long-period grating filter device using a multi-cladding structure according to a fourth preferred embodiment of the present invention. An optical fiber shown in FIG. 10 has an inner cladding and outer claddings. Once the boundary condition between the inner cladding and the outer claddings is satisfied, the basic optical fiber structure for temperature compensation is completed. Specifically, the optical fiber has a core, a primary cladding surrounding the core, a secondary cladding surrounding the primary cladding, and a third cladding surrounding the secondary cladding. Consequently, the coupling wavelength shifts are canceled out according to the kinds and concentrations of dopants added to the core and the outer cladding, thereby compensating the temperature for the long-period fiber gratings.

In accordance with the present invention, a novel optical fiber with a multi-cladding structure is provided to be insensitive to the external environment to produce temperature-compensated, long-period grating. Therefore, the optical fiber can be stably used as a grating filter without a temperature controller in diverse environments. Furthermore, as the cladding mode is determined by an inner cladding, the overlapping integral between the core mode and the cladding mode is great. Thus, the coupling efficiency is high and a desired coupling mode is easily grown in fabricating long-period fiber gratings.

While the invention has been shown and described with reference to certain preferred embodiments thereof, it will be understood by those skilled in the art that various changes in form and details may be made therein without departing from the spirit and the scope of the invention as defined by the appended claims.

What is claimed is:

1. A temperature-compensated, long-period grating device, comprising:

an optical fiber comprising a core having a plurality of long-period gratings formed periodically thereon, said core is doped with a first dopant to exhibit a positive coupling wavelength shift as the temperature increases;

an inner cladding surrounding said core and having a refractive index lower than said core;

an outer cladding surrounding said inner cladding and having a lower refractive index than said inner cladding, said outer cladding is doped with a second dopant to exhibit a negative coupling wavelength shift as the refractive index of said outer cladding is increased with temperature; and wherein said positive wavelength shift and said negative wavelength shift are canceled out.

2. The device of claim 1, wherein said inner cladding is formed of pure silica.

3. The device of claim 1, wherein said first dopant includes $GeO_2$.

4. The device of claim 1, wherein said second dopant includes $B_2O_3$.

5. The device of claim 1, wherein said first dopant includes $GeO_2$ and $B_2O_3$.

6. The device of claim 1, wherein a sum of the coupling wavelength shift caused by the refractive index of said core that is increased with the concentration of $GeO_2$ and the coupling wavelength shift caused by the refractive index of said core that is decreased with the concentration of $B_2O_3$ is a positive wavelength shift.

7. The device of claim 1, wherein said second dopant includes $GeO_2$ and $B_2O_3$.

8. The device of claim 1, wherein a sum of the coupling wavelength shift caused by the refractive index of said outer cladding that is increased with the concentration of $GeO_2$ and the coupling wavelength shift caused by the refractive index of said outer cladding that is decreased with the concentration of $B_2O_3$ is a negative wavelength shift.

9. A temperature-compensated, long-period grating device, comprising:

an optical fiber comprising a core having a plurality of long-period fiber gratings formed periodically thereon and doped with a first dopant to exhibit a negative coupling wavelength shift as the temperature increases;

an inner cladding surrounding said core and having a refractive index lower than said core;

an outer cladding surrounding said inner cladding and having a lower refractive index than said inner cladding, said outer cladding is doped with a second dopant to exhibit a positive coupling wavelength shift as the refractive index of said outer cladding is decreased with temperature; and wherein said positive wavelength shift and said negative wavelength shift are canceled out.

10. The device of claim 9, wherein said inner cladding is formed of pure silica.

11. The device of claim 9, wherein said first dopant includes $GeO_2$.

12. The device of claim 9, wherein said second dopant includes $B_2O_3$.

13. The device of claim 9, wherein said first dopant includes $GeO_2$ and $B_2O_3$.

14. The device of claim 9, wherein the sum of the coupling wavelength shift caused by the refractive index of said core that is increased with the concentration of $GeO_2$ and the coupling wavelength shift caused by the refractive index of said core that is decreased with the concentration of $B_2O_3$ is a negative wavelength shift.

15. The device of claim 9, wherein said second dopant includes $GeO_2$ and $B_2O_3$.

16. The device of claim 9, wherein the sum of the coupling wavelength shift caused by the refractive index of said outer cladding that is increased with the concentration of $GeO_2$ and the coupling wavelength shift caused by the refractive index of said outer cladding that is decreased with the concentration of $B_2O_3$ is a positive wavelength shift.

* * * * *